United States Patent
Hsu

(10) Patent No.: US 9,372,527 B2
(45) Date of Patent: Jun. 21, 2016

(54) DATA ACCESS MANAGEMENT APPARATUS AND DATA ACCESS MANAGEMENT METHOD

(71) Applicants: INVENTEC (PUDONG) TECHNOLOGY CORPORATION, Shanghai (CN); INVENTEC CORPORATION, Taipei (TW)

(72) Inventor: Chao-Hsien Hsu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 208 days.

(21) Appl. No.: 14/228,080

(22) Filed: Mar. 27, 2014

(65) Prior Publication Data

US 2015/0153813 A1    Jun. 4, 2015

(30) Foreign Application Priority Data

Nov. 29, 2013   (CN) .......................... 2013 1 0631698

(51) Int. Cl.
*G06F 1/32* (2006.01)
*G06F 3/06* (2006.01)

(52) U.S. Cl.
CPC ............ *G06F 1/3268* (2013.01); *G06F 1/3221* (2013.01); *G06F 3/0625* (2013.01); *Y02B 60/1246* (2013.01)

(58) Field of Classification Search
CPC ... G06F 1/3268; G06F 1/3221; G06F 3/0625; G06F 1/32; Y02B 60/1246; Y02B 60/1285
See application file for complete search history.

(56) References Cited

U.S. PATENT DOCUMENTS

| | | | | |
|---|---|---|---|---|
| 2009/0031154 A1* | 1/2009 | Ikawa | ................... | G06F 1/3221 713/320 |
| 2009/0254702 A1* | 10/2009 | Kumano | ............... | G06F 1/3203 711/112 |
| 2013/0332758 A1* | 12/2013 | Sasaki | .................... | G06F 1/324 713/322 |

* cited by examiner

*Primary Examiner* — Fahmida Rahman
(74) *Attorney, Agent, or Firm* — Huffman Law Group, PC

(57) ABSTRACT

The disclosure provides a data access management method and a data access management apparatus which includes an enabling signal generating unit for generating an enabling signal according to a processing signal, a power supplying unit for generating a voltage signal according to the enabling signal, at least a first storage unit for storing a plurality of pieces of data and staying in a standby state or a disable state according to the voltage signal, and a first processing unit. Each piece of data respectively has an access time. The first processing unit calculates a non-access proportion of the data not been accessed for a preset time, according to the access times and then determines whether the non-access proportion is larger than a preset proportion, to generate the processing signal for controlling the at least storage unit to stay in the disable state or the standby state.

6 Claims, 5 Drawing Sheets

# DATA ACCESS MANAGEMENT APPARATUS AND DATA ACCESS MANAGEMENT METHOD

CROSS-REFERENCE TO RELATED APPLICATIONS

This non-provisional application claims priority under 35 U.S.C. §119(a) on Patent Application No(s). 201310631698.2 filed in China on Nov. 29, 2013, the entire contents of which are hereby incorporated by reference.

BACKGROUND OF THE INVENTION

1. Technical Field of the Invention

The disclosure relates to a data management apparatus and a data management method, more particularly to a data access management apparatus and a data access management method.

2. Description of the Related Art

Generally, computer systems or servers have storage devices such as hard disk drives for data accessing. No matter if the storage devices are accessed or not, the computer systems or servers always power the storage devices to maintain the operation of the storage devices. In other words, when the storage device works in a duty state, the storage device can be accessed, and when the storage device works in a standby state, the storage device is waiting for next time data accessing.

When data is stored into the storage devices, the data having similar time tags will be stored in the same storage device. Since some data is accessed not often, the storage devices storing the data are also accessed not often. If the computer system or server still powers these storage devices to maintain their normal operation, lots of power will be wasted.

SUMMARY OF THE INVENTION

According to one or more embodiments, the disclosure provides a data access management apparatus which includes: an enabling signal generating unit configured to generate an enabling signal according to a first processing signal; a power supplying unit coupled with the enabling signal generating unit and configured to receive the enabling signal to generate a voltage signal; at least one first storage unit coupled with the power supplying unit and configured to store a plurality of pieces of data and alternately work in a standby state or a disable state according to the voltage signal, wherein each piece of the data has an access time; and a first processing unit coupled with the at least one first storage unit and the enabling signal generating unit and configured to read the access times to calculate a non-access proportion of the data not been accessed for a preset period, and determine whether the non-access proportion is larger than a preset proportion. When the non-access proportion is larger than the preset proportion, the first processing unit generates the first processing signal for controlling the at least one first storage unit to work in the disable state. When the non-access proportion is not larger than the preset proportion, the first processing unit generates the first processing signal for controlling the at least one first storage unit to work in the standby state.

In one of the above embodiments, the first processing unit further receives an access command to generate the first processing signal for controlling the at least one first storage unit to work in a duty state, and performs a data access process on the at least one first storage unit in the duty state.

In one of the above embodiments, the data access management apparatus further includes: a first receiving and transmission unit coupled with the first processing unit and configured to output a storing command and the pieces of data after the first processing unit generates the storing command and reads out the pieces of data from the at least one first storage unit when the non-access proportion is larger than the preset proportion; a second receiving and transmission unit coupled with the first receiving and transmission unit; a second processing unit coupled with the second receiving and transmission unit and configured to receive the storing command and the pieces of data, and perform a storing process on the pieces of data according to the storing command; and at least one second storage unit, coupled with the second processing unit configured to store the pieces of data. When the second processing unit finishes the storing process, the second processing unit generates a response signal and transmits the response signal to the first processing unit through the first receiving and transmission unit and the second receiving and transmission unit, so that the first processing unit, according to the response signal, generates the first processing signal for controlling the at least one first storage unit to work in the standby state.

In one of the above embodiments, when the second processing unit finishes the storing process, the second processing unit further controls the at least one second storage unit storing the pieces of data to work in the disable state.

According to one or more embodiments, the disclosure also provides a data access management method for a data access management apparatus which includes a first processing unit and at least one first storage unit. The data access management method includes steps of: reading a plurality of pieces of data from at least one first storage unit via the first processing unit, wherein each piece of data has an access time; calculating a non-access proportion of the data which has not been accessed for a preset period, according to the access times via the first processing unit; via the first processing unit, determining whether the non-access proportion is larger than a preset proportion; controlling the at least one first storage unit to work in a disable state via the first processing unit when the non-access proportion is larger than the preset proportion; and controlling the at least one first storage unit to work in a standby state via the first processing unit when the non-access proportion is not larger than the preset proportion.

In one of the above embodiments, the data access management method further includes steps of: via the first processing unit, determining whether an access command is received; returning to the step of determining whether the access command is received via the first processing unit when the access command is not received; and controlling the at least one first storage unit to work in a duty state according to the access command and performing a data access process on the at least one first storage unit in the duty state via the first processing unit when the access command is received.

In one of the above embodiments, the data access management apparatus further includes a second processing unit and at least one second storage unit, and the data access management method further includes steps of: via the first processing unit, generating a storing command, reading out the pieces of data from the at least one first storage unit, and outputting the storing command and the pieces of data; via the second processing unit, receiving the storing command and the pieces of data; performing a storing process on the pieces of data according to the storing command to store the pieces of data in the at least one second storage unit via the second processing unit; generating a response signal and transmitting the response signal to the first processing unit via the second processing unit; and controlling the at least one first storage unit to work in the standby state according to the response signal via the first processing unit.

In one of the above embodiments, the data access management method further includes a step of: controlling the at least one second storage unit, which stores the pieces of data of the at least one first storage unit, to work in the disable state via the second processing unit.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
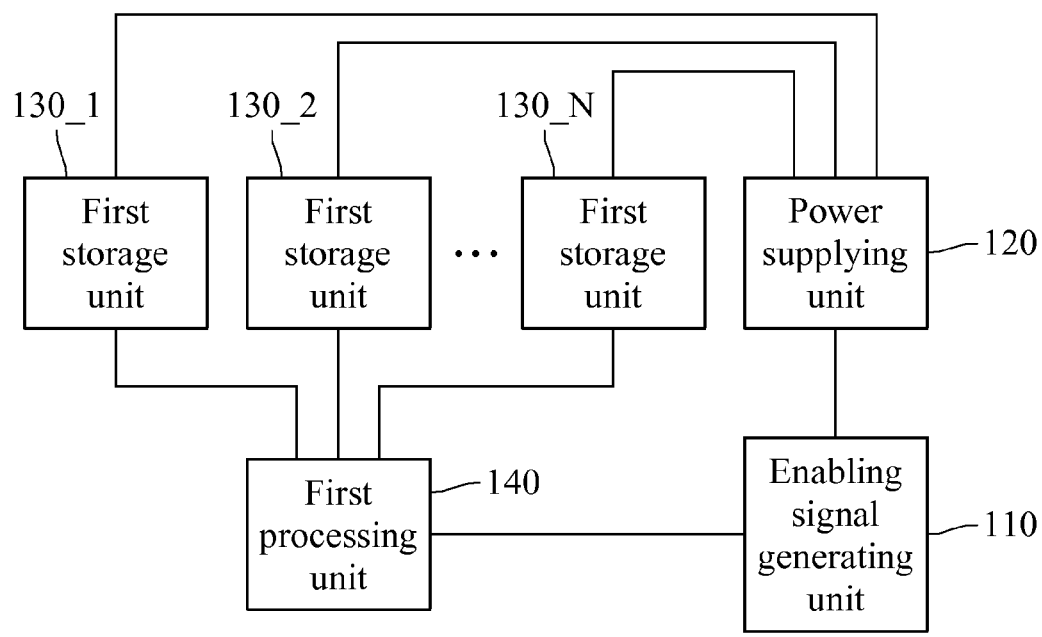
FIG. 1 is a schematic view of a data access management apparatus in the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the flowing embodiments, the same label indicates the same element or similar elements.

FIG. 1 is a schematic view of a data access management apparatus in the disclosure. A data access management apparatus 100 includes an enabling signal generating unit 110, a power supplying unit 120, first storage units 130_1 to 130_N and a first processing unit 140, and N is a positive integer larger than or equal to 1.

The enabling signal generating unit 110 generates an enabling signal according to a first processing signal. The power supplying unit 120 couples with the enabling signal generating unit 110 and receives the enabling signal to generate a voltage signal. Specifically, the power supplying unit 120 is controlled with the enabling signal to determine whether to supply the voltage signal or not. The voltage signal includes a normal work voltage and a standby voltage.

The first storage units 130_1 to 130_N couple with the power supplying unit 120, and each of the first storage units 130_1 to 130_N stores multiple pieces of data. Each piece of data has its access time, and dates presented by the access times of the pieces of data are sufficiently the same. Moreover, the first storage units 130_1 to 130_N work in a standby state or a disable state according to the voltage signal. In the standby state, the first storage units 130_1 to 130_N are supplied with the standby voltage by the power supplying unit 120, and are being standby until a next data access process is performed. In the disable state, the first storage units 130_1 to 130_N are not supplied with the voltage signal by the power supplying unit 120 and are disabled.

The first processing unit 140 couples with the first storage units 130_1 to 130_N and the enabling signal generating unit 110, reads the access times of the pieces of data from the first storage units 130_1 to 130_N, and according to the read access times, calculates a non-access proportion of the pieces of data not been accessed for a preset period. For example, the preset period is one month. Specifically, the first processing unit 140 compares each of the access times with the preset period to count the data which has not been accessed for more than or less than the preset period, and then calculates the non-access proportion of data not been accessed for the preset period.

After obtaining the non-access proportion, the first processing unit 140 determines whether the non-access proportion is larger than a preset proportion. For example, the preset proportion is 90 percent of a storage capacity of one first storage unit. Take the first storage unit 130_1 as example. If the non-access proportion related to the first storage unit 130_1 is larger than the preset proportion, it means that there the data in the first storage unit 130_1 has not been accessed for a long time. Herein, the processing unit 140 will generate the first processing signal for controlling the enabling signal generating unit 110 to generate the corresponding enabling signal for controlling the power supplying unit 120 not to supply the voltage signal. Thus, the first storage unit 130 will enter in the disable state. In this way, the storage units which have not been accessed for a long time will be turned off, thereby reducing the waste of power. On the other hand, if the non-access proportion related to the first storage unit 130_1 is not larger than the preset proportion, the processing unit 140 generates the first processing signal to control the enabling signal generating unit 110 to generate the corresponding enabling signal for controlling the power supplying unit 120 to supply the standby voltage of the voltage signal for controlling the first storage unit 130_1 to enter the standby state. In this way, the first storage unit 130_1 will stay with the standby voltage and be staying standby until a next data access process is performed.

Specifically, when the first processing unit 140 receives an access command, e.g. a command for reading out data in the first storage unit 130_1, the first processing unit 140, according to the access command, generates the first processing signal for controlling the enabling signal generating unit 110 to generate a corresponding enabling signal for controlling the power supplying unit 120 to supply a voltage signal as, e.g. a work voltage, for controlling the first storage unit 130_1 to enter into the standby state. When the first storage unit 130_1 works in the standby state, the first processing unit 140 can perform the data access process on the first storage unit 130_1 in the standby state to read out the data from the first storage unit 130_1.

Figure 2:
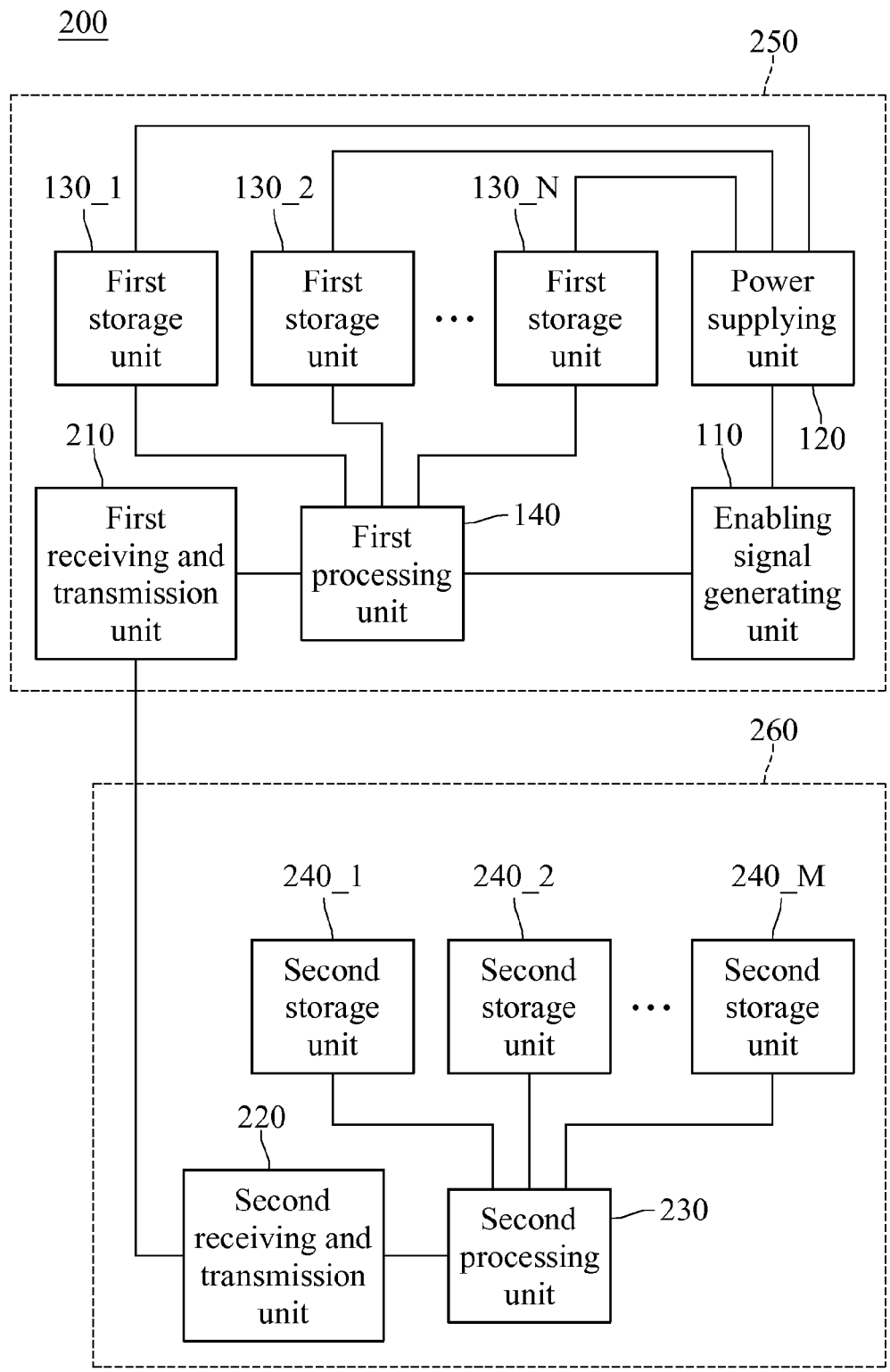
FIG. 2 is a schematic view of other data access management apparatus in the disclosure.

FIG. 2 is a schematic view of other data access management apparatus in the disclosure. A data access management apparatus 200 includes the enabling signal generating unit 110, the power supplying unit 120, the first storage units 130_1 to 130_N and the first processing unit 140 in FIG. 1 and also includes a first receiving and transmission unit 210, a second receiving and transmission unit 220, a second processing unit 230 and second storage units 240_1 to 240_M. M is a positive integer larger than or equal to 1, and N and M may be the same or different.

In this embodiment, the connection and operation of the enabling signal generating unit 110, the power supplying unit 120, the first storage units 130_1 to 130_N and the processing unit 140 can be referred to the description in FIG. 1 and not be repeated hereinafter. The enabling signal generating unit 110, the power supplying unit 120, the first storage units 130_1 to 130_N, the first processing unit 140 and the first receiving and transmission unit 210 are grouped into a first server 250, and the second receiving and transmission unit 220, the second processing unit 230, the second storage units 240_1 to 240_M are grouped into a second server 260. For example, the performance of the first processing unit 140 is higher than the performance of the second processing unit 230, that is, the first server 250 is a master device for data accessing and the second server 260 is a backup device for data accessing.

The first receiving and transmission unit 210 couples with the first processing unit 140. When the non-access proportion is larger than the preset proportion, the first processing unit 140 not only generates the first processing signal for controlling the first storage unit 130_1 to enter into the disable state, but also generates a storing command for reading out data in the first storage units 130_1 to 130_N. For example, the first processing unit 140 reads out data from the first storage unit 130_1. Subsequently, the first processing unit 140 outputs the storing command and the read data through the first receiving and transmission unit 210.

The second receiving and transmission unit 220 wiredly or wirelessly couples with the first receiving and transmission unit 210 and receives the data and the storing command outputted by the first receiving and transmission unit 210.

The second processing unit 230 couples with the second receiving and transmission unit 220, receives the storing command and the data received by the second receiving and transmission unit 220, and performs a storing process on the received data of first storage unit 130_1 according to the storing command.

The second storage units 240_1 to 240_M couple with the second processing unit 230 and store the data received by the second processing unit 230. In this embodiment, the second processing unit 230, according to the storing command, stores the data of the first storage unit 130_1 in corresponding one, e.g. the second storage unit 240_1, of the second storage units 240_1 to 240_M.

Furthermore, when the second processing unit 230 finishes the storing process for accomplishing the backup of the data of the first storage unit 130, the second processing unit 230 will generate a response signal and transmit the response signal to the first processing unit 140 through the second receiving and transmission unit 220 and the first receiving and transmission unit 210, to notify the first processing unit 140 that the data in the first storage unit 130 has been backed up.

Then, the first processing unit 140 deletes the data from the first storage unit 130_1 according to the response signal and then generates the first processing signal for controlling the enabling signal generating unit 110 to generate the enabling signal for controlling the power supplying unit 120 to generate the standby voltage of the voltage signal. Herein, the first storage unit 130_1 enters into the standby state due to the standby voltage. In other words, the first storage unit 130_1 works in the standby state instead of the disable state. Therefore, the first storage unit 130_1 can operate with the standby voltage and be staying standby until a next data access process, thereby maintain the performance of the first server 250 accessing data.

Moreover, when the second processing unit 230 finishes the storing process, the second processing unit 230 can further control one or more of the second storage units 240_1 to 240_M (e.g. the second storage unit 240_1) storing the data of the first storage unit 130_1, to enter into the disable state, thereby reducing the waste of power.

Figure 3:
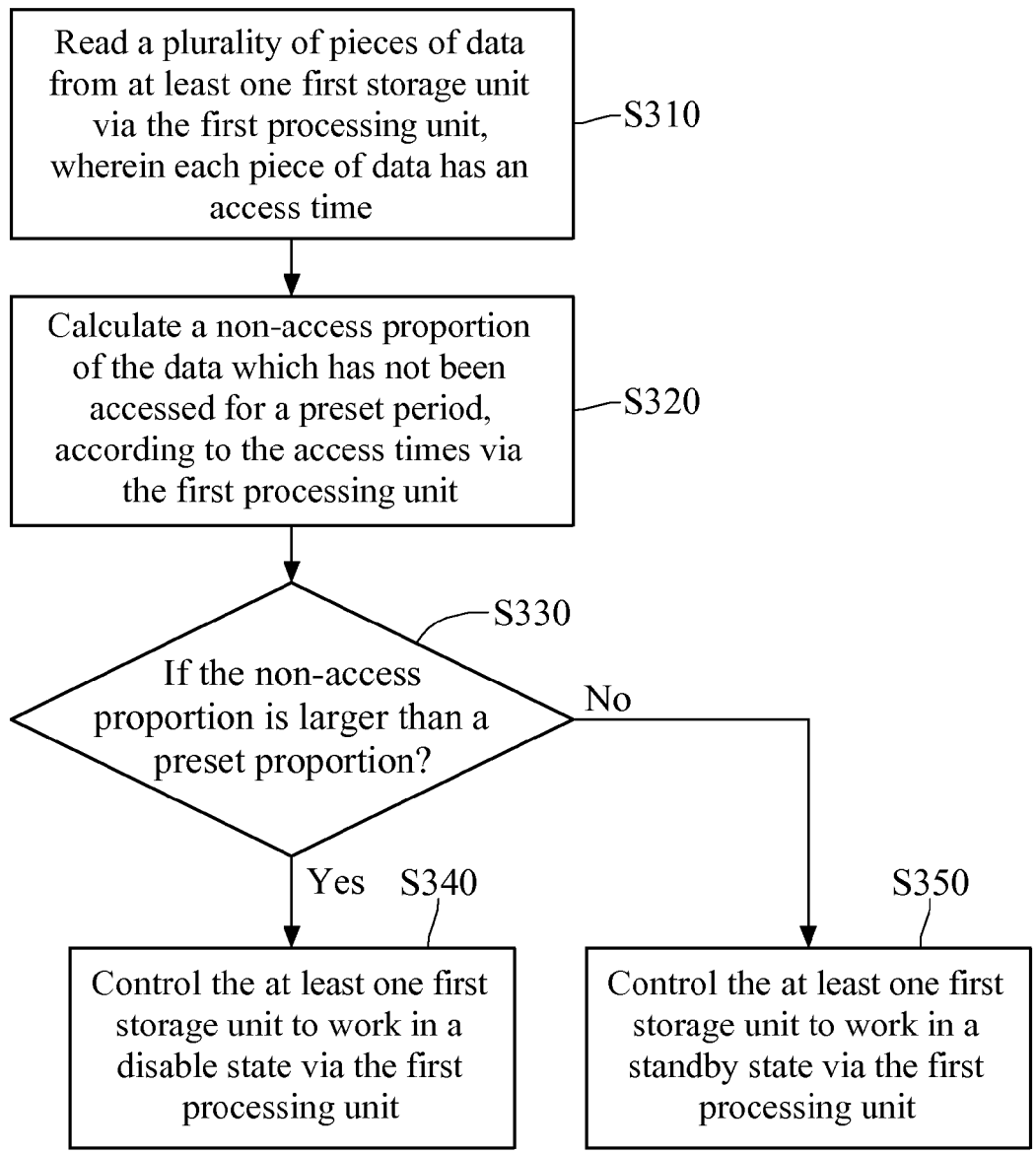
FIG. 3 is a flowchart of a data access management method in the disclosure.

The above description can be summarized in a data access management method. FIG. 3 is a flowchart of a data access management method in the disclosure. The data access management method is performed on the data access management apparatus in FIG. 1 which includes a first processing unit and at least one first storage unit. As shown in step S310, the first processing unit reads out a plurality of pieces of data from at least one first storage unit. Each piece of data has an access time.

As shown in step S320, the first processing unit calculates a non-access proportion of the read pieces of data not been accessed for a preset period, according to the access times. As shown in step S330, the first processing unit determines whether the non-access proportion is larger than a preset proportion. If the non-access proportion is larger than the preset proportion, the first processing unit controls the at least one first storage unit to enter into a disable state, as shown in step S340. As shown in step S350, if the non-access proportion is not larger than the preset proportion, the first processing unit controls the at least one first storage unit to enter into a standby state.

Figure 4:
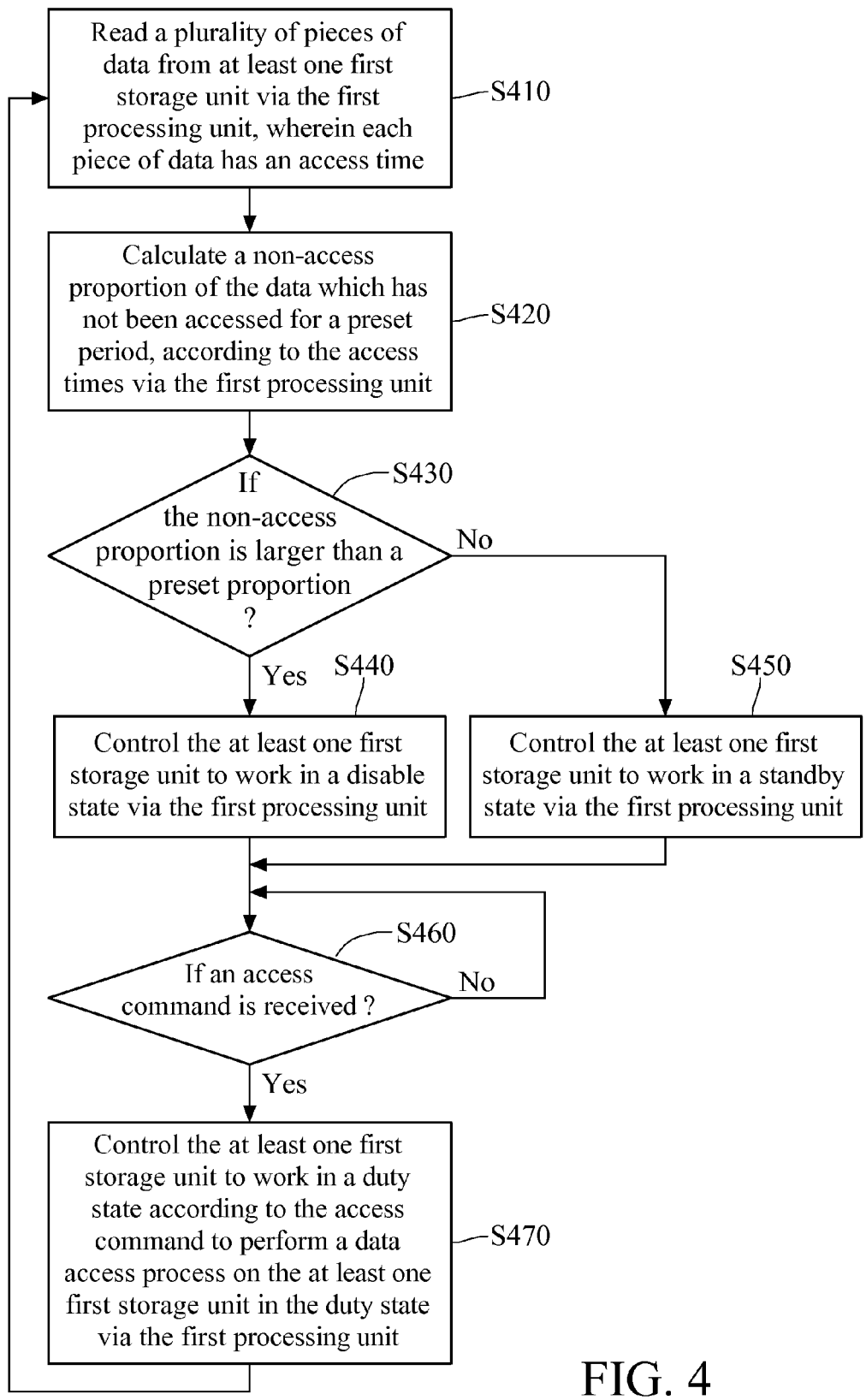
FIG. 4 is a flowchart of other data access management method in the disclosure.

FIG. 4 is a flowchart of other data access management method in the disclosure. The data access management method is performed by the data access management apparatus in FIG. 1 which includes a first processing unit and at least one first storage unit. As shown in step S410, the first processing unit reads out a plurality of pieces of data from the at least one first storage unit. Each piece of data has an access time.

As shown in step S420, the first processing unit, according to the access times, calculates a non-access proportion of the data not been accessed for a preset period. As shown in step S430, the first processing unit determines whether the non-access proportion is larger than a preset proportion. If the non-access proportion is larger than the preset proportion, the first processing unit controls the at least one first storage unit to enter into a disable state, as shown in step S440. On the other hand, if the non-access proportion is not larger than the preset proportion, the first processing unit controls the at least one first storage unit to enter into a standby state, as shown in step S450.

Moreover, when the non-access proportion is not larger than the preset proportion, the first processing unit also determines whether there is an access command, as shown in step S460. If there is not any access command, the first processing unit returns to the step S460 to continue determining whether there is an access command. If there is an access command, the first processing unit, according to the access command, controls the at least one first storage unit to work in a duty state, to perform a data access process on the at least one first storage unit in the duty state, as shown in step S470. After the data access process is performed on the at least one first storage unit, the data access management method returns to the step S410 to continue managing the accessing of the at least one first storage unit.

Figure 5:
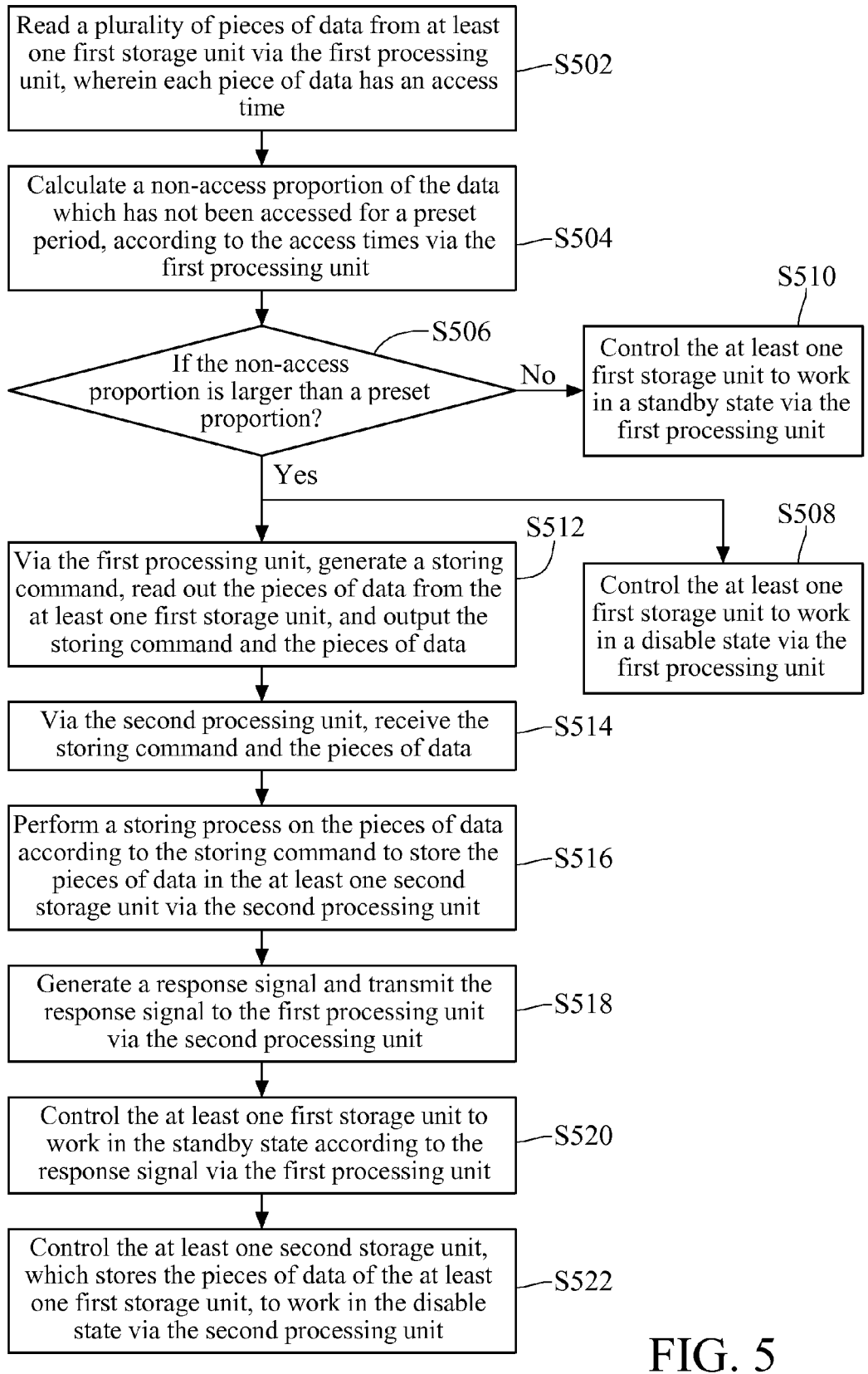
FIG. 5 is a flowchart of other data access management method in the disclosure.

FIG. 5 is a flowchart of other data access management method in the disclosure. The data access management method is performed by the data access management apparatus in FIG. 2 which includes a first processing unit, at least one first storage unit, a second processing unit and at least one second storage unit. As shown in step S502, the first processing unit reads a plurality of pieces of data of the at least one first storage unit. Each piece of data has an access time.

As shown in step S504, the first processing unit, according to the access times, calculates a non-access proportion of the read data not been accessed for a preset period. As shown in step S506, the first processing unit determines whether the non-access proportion is larger than a preset proportion. If the non-access proportion is larger than a preset proportion, the first processing unit controls the at least one first storage unit to enter into a disable state, as shown in step S508. If the non-access proportion is not larger than the preset proportion, the first processing unit controls the at least one first storage unit to enter into a standby state, as shown in step S510.

When the non-access proportion is larger than the preset proportion, the first processing unit generates a storing command, reads out data from the at least one first storage unit, and outputs the storing command and the read data, as shown in step S512. As shown in step S514, the second processing unit receives the storing command and the data from the first processing unit. As shown in step S516, the second processing unit, according to the received storing command, performs a storing process on the received data to store the received data in the at least one second storage unit. When the second processing unit finishes the storing process, the second processing unit generates a response signal and transmits the response signal to the first processing unit, as shown in step S518. As shown in step S520, the first processing unit, according to the response signal, controls the at least one first storage unit to work in a standby state. As shown in step S522, the second processing unit controls the at least one second storage unit storing the data of the at least one first storage unit to work in a disable state.

In view of the above description, the disclosure employs a first processing unit to read the access time of data of at least one first storage unit to determine whether a non-access proportion of the data not been accessed for a preset period is larger than a preset proportion, and then employs an enabling signal generating unit and a power supplying unit to control the at least one first storage unit to work in a standby state or a disable state. When the non-access proportion is larger than the preset proportion, the first processing unit further reads out the data from the at least one first storage unit and transfers the read data to a second processing unit. The second processing unit stores the data in at least one second storage unit. Therefore, the disclosure may efficiently manage power for storage units, reduce the waste of power, and maintain the performance of accessing data.

What is claimed is:

1. A data access management apparatus, comprising:
   an enabling signal generating unit configured to generate an enabling signal according to a first processing signal;
   a power supplying unit coupled with the enabling signal generating unit and configured to receive the enabling signal to generate a voltage signal;
   at least one first storage unit coupled with the power supplying unit and configured to store a plurality of pieces of data and work in a standby state or a disable state according to the voltage signal, wherein each piece of the data has an access time;
   a first processing unit coupled with the at least one first storage unit and the enabling signal generating unit and configured to read the access times to calculate a non-access proportion of the data not been accessed for a preset period, and determine whether the non-access proportion is larger than a preset proportion;
   a first receiving and transmission unit coupled with the first processing unit and configured to output a storing command and the pieces of data after the first processing unit generates the storing command and reads out the pieces of data from the at least one first storage unit when the non-access proportion is larger than the preset proportion;
   a second receiving and transmission unit coupled with the first receiving and transmission unit;
   a second processing unit coupled with the second receiving and transmission unit and configured to receive the storing command and the pieces of data, and perform a storing process on the pieces of data according to the storing command; and
   at least one second storage unit, coupled with the second processing unit configured to store the pieces of data;
   wherein when the non-access proportion is larger than the preset proportion, the first processing unit generates the first processing signal for controlling the at least one first storage unit to stay in the disable state;
   when the non-access proportion is not larger than the preset proportion, the first processing unit generates the first processing signal for controlling the at least one first storage unit to stay in the standby state;
   wherein when the second processing unit finishes the storing process, the second processing unit generates a response signal and transmits the response signal to the first processing unit through the first receiving and transmission unit and the second receiving and transmission unit, so that the first processing unit, according to the response signal, generates the first processing signal for controlling the at least one first storage unit to stay in the standby state.

2. The data access management apparatus according to claim 1, wherein the first processing unit receives an access command to generate the first processing signal for controlling the at least one first storage unit to stay in a duty state, and then perform a data access process on the at least one first storage unit.

3. The data access management apparatus according to claim 1, wherein when the second processing unit finishes the storing process, the second processing unit further controls the at least one second storage unit storing the pieces of data to stay in the disable state.

4. A data access management method for a data access management apparatus which comprises a first processing unit, a second processing unit, at least one first storage unit, and at least one second storage unit, wherein the method comprises steps of:
   reading a plurality of pieces of data from the at least one first storage unit via the first processing unit, wherein each piece of data has an access time;
   calculating a non-access proportion of the data which has not been accessed for a preset period, according to the access times via the first processing unit;
   via the first processing unit, determining whether the non-access proportion is larger than a preset proportion;
   controlling the at least one first storage unit to stay in a disable state via the first processing unit when the non-access proportion is larger than the preset proportion;
   controlling the at least one first storage unit to stay in a standby state via the first processing unit when the non-access proportion is not larger than the preset proportion;
   via the first processing unit, generating a storing command, reading out the pieces of data from the at least one first storage unit, and outputting the storing command and the pieces of data;
   via the second processing unit, receiving the storing command and the pieces of data;
   performing a storing process on the pieces of data according to the storing command to store the pieces of data in the at least one second storage unit via the second processing unit;
   generating a response signal and transmitting the response signal to the first processing unit via the second processing unit; and controlling the at least one first storage unit to stay in the standby state according to the response signal via the first processing unit.

5. The data access management method according to claim 4, further comprising:
via the first processing unit, determining whether an access command is received;
returning to the step of determining whether the access command is received via the first processing unit when the access command is not received; and
controlling the at least one first storage unit to stay in a duty state according to the access command and performing a data access process on the at least one first storage unit in the duty state via the first processing unit when the access command is received.

6. The data access management method according to claim 4, further comprising:
controlling the at least one second storage unit, which stores the pieces of data of the at least one first storage unit, to stay in the disable state via the second processing unit.

* * * * *